(12) United States Patent
Yang et al.

(10) Patent No.: US 10,474,238 B2
(45) Date of Patent: Nov. 12, 2019

(54) SYSTEMS AND METHODS FOR VIRTUAL AFFECTIVE TOUCH

(71) Applicant: Immersion Corporation, San Jose, CA (US)

(72) Inventors: Rui Yang, Beijing (CN); Jinhong Yu, Shanghai (CN)

(73) Assignee: Immersion Corporation, San Jose, CA (US)

( * ) Notice: Subject to any disclaimer, the term of this patent is extended or adjusted under 35 U.S.C. 154(b) by 0 days.

(21) Appl. No.: 15/874,192

(22) Filed: Jan. 18, 2018

(65) Prior Publication Data

US 2018/0246572 A1   Aug. 30, 2018

Related U.S. Application Data

(63) Continuation-in-part of application No. PCT/CN2017/074784, filed on Feb. 24, 2017.

(51) Int. Cl.
*G06F 3/041* (2006.01)
*G06F 3/044* (2006.01)
*G06F 3/01* (2006.01)
*G06F 3/0488* (2013.01)

(52) U.S. Cl.
CPC ............... *G06F 3/016* (2013.01); *G06F 3/011* (2013.01); *G06F 3/044* (2013.01); *G06F 3/0414* (2013.01); *G06F 3/04883* (2013.01)

(58) Field of Classification Search
CPC ........ G06F 3/016; G06F 3/0414; G06F 3/044; G06F 3/04883
See application file for complete search history.

(56) References Cited

U.S. PATENT DOCUMENTS

| 8,294,557 | B1 | 10/2012 | El Saddik et al. |
| 2008/0218490 | A1* | 9/2008 | Kim ..................... G06F 3/0488 345/173 |
| 2014/0143682 | A1 | 5/2014 | Druck |

(Continued)

FOREIGN PATENT DOCUMENTS

| CN | 104301202 | 1/2015 |
| CN | 104579919 | 4/2015 |
| CN | 106371573 | 2/2017 |

OTHER PUBLICATIONS

EP 18158107.5, "Extended European Search Report", Jul. 6, 2018, 9 pages.

(Continued)

*Primary Examiner* — Robert J Michaud
(74) *Attorney, Agent, or Firm* — Kilpatrick Townsend & Stockton LLP (57) ABSTRACT

Systems and methods for virtual affective touch are disclosed. One illustrative system described herein includes: a touch screen display; a haptic output device; and a processor configured to: display a visual representation of a receiving user on the touch screen display; receive from the touch screen display a sensor signal associated with a gesture by a sending user; transmit a signal associated with the gesture and the visual representation to a receiving device; determine a haptic effect based in part on the gesture and the visual representation of the receiving user; and transmit a haptic signal associated with the haptic effect to the haptic output device configured to output the haptic effect.

20 Claims, 7 Drawing Sheets

(56) References Cited

U.S. PATENT DOCUMENTS

| | | |
|---|---|---|
| 2015/0200881 A1 | 7/2015 | Zheng |
| 2015/0268725 A1* | 9/2015 | Levesque ............... G06F 3/016 |
| | | 345/156 |

OTHER PUBLICATIONS

PCT/CN2017/074784, "International Search Report and Written Opinion", Nov. 24, 2017, 12 pages.

Basdogan, Cagatay et al., "An Experimental Study on the Role of Touch in Shared Virtual Environments", ACM Transactions on Computer-Human Interaction, vol. 7, No. 4, Dec. 2000, pp. 443-460, 18 pages.

Brave, Scott et al. "InTouch: A Medium for Haptic Interpersonal Communication." Late Breaking Results, CHI '97, Apr. 1997, MIT Media Laboratory, Cambridge, MA, 2 pages.

Brave, Scott et al., "Tangible Interfaces for Remote Communication and Collaboration," thesis submitted to the Program in Media Arts and Sciences, School of Architecture and Planning, In Partial Fulfilment of the Requirements for the Degree of Master of Science in Media Arts and Sciences at the Massachusetts Institute of Technology, Jun. 1998, 59 pages.

CuteCircuit, "The Hugshirt" http://cutecircuit.com/the-hug-shirt/ or http://cutecircuit.com/time-bestinventions-of-2006-hug-shirt/, accessed via the internet Jan. 25, 2018, 7 pages.

Dobson, Kelly, et al., "Creating Visceral Personal and Social Interactions in Mediated Spaces", Interactive Posters, CHI 2001, Mar. 31-Apr. 5, 2001, MIT Media Lab Cambridge, MA, 3 pages.

Gallace, Albert et al., Technologies of Touch, "In touch with the future The Sense of Touch From Cognitive Neuroscience to Virtual Reality", Oxford University Press, Oxford, United Kingdom, p. 221-225, Section 9.7.

The Guardian, "Like-A-Hug? The Facebook vest that gives you a hug from your friends", https://www.theguardian.com/culture/2012/oct/09/like-a-hug-facebook-vest-friends accessed via the internet on Jan. 25, 2018, 4 pages.

Kappas, Arvid et al., "Face-to-Face Communication over the Internet: Emotions in a Web of Culture, Language, and Technology", (Studies in Emotion and Social Interaction), Published in the US by Cambridge University Press, New York, 2001, pp. 1-291, 28 pages.

Motamedi, Nima, "Keep in Touch: A Tactile-Vision Intimate Interface", Chapter 1—Connectedness, Feb. 15-17, 2007, Baton Rouge, LA, School of Interactive Arts and Technology, Simon Fraser University, pp. 21-22, 2 pages.

Oakley, Ian et al., "Contact IM: Exploring Asynchronous Touch Over Distance", Palpable Machines Research 2002, Available from: Sile O'Modhrain, Apr. 1, 2015, 3 pages.

* cited by examiner

Figure 5

SYSTEMS AND METHODS FOR VIRTUAL AFFECTIVE TOUCH

CROSS-REFERENCE TO RELATED APPLICATIONS

This application is a continuation-in-part of and claims priority to International Application No. PCT/CN2017/074784, filed on Feb. 24, 2017, with the China Intellectual Property Office, and entitled "Virtual Affective Touch," the entirety of which is incorporated by reference herein.

FIELD OF THE INVENTION

This application relates to user-interactions and communications in a shared social media application/interface and, more particularly, to systems and methods for haptic interaction between one or more users.

BACKGROUND

Haptic-enabled devices have become increasingly popular as are haptic-enabled environments. For instance, mobile and other devices may be configured with touch-sensitive surfaces so that a user can provide input by touching portions of the touch-sensitive display. Alternatively, gesture input and other input for haptic enabled devices or environments are also becoming popular for wearables, VR or AR devices, automotive, gaming, live events, group events and other environments. These devices also include the capability to provide haptic feedback. Video, messages, stickers, emoticons may be created, edited, sent, received, felt and displayed on haptic enabled devices. Such activities may use conventional text or messaging conventions, shared social media conventions, group events, gaming or other interactive applications between users. Many devices are being equipped with haptic capability and a user can also feel haptic effects as a result of their interaction with the device or another user's interaction with their device.

SUMMARY

In one embodiment, a system according to the present disclosure comprises: a touch screen display; a haptic output device; and a processor configured to: display a visual representation of a receiving user on the touch screen display; receive from the touch screen display a sensor signal associated with a gesture by a sending user; transmit a signal associated with the gesture and the visual representation to a receiving device; determine a haptic effect based in part on the gesture and the visual representation of the receiving user; and transmit a haptic signal associated with the haptic effect to the haptic output device configured to output the haptic effect.

In another embodiment, a method according to the present disclosure comprises: displaying a visual representation of a receiving user on a touch screen display; receiving from the touch screen display a sensor signal associated with a gesture by a sending user; transmitting a signal associated with the gesture and the visual representation to a receiving device; determining a haptic effect based in part on the gesture and the visual representation of the receiving user; and transmitting a haptic signal associated with the haptic effect to a haptic output device configured to output the haptic effect.

In yet another embodiment, a computer readable medium may comprise program code, which when executed by a processor is configured to cause the processor to: display a visual representation of a receiving user on a touch screen display; receive from the touch screen display a sensor signal associated with a gesture by a sending user; transmit a signal associated with the gesture and the visual representation to a receiving device; determine a haptic effect based in part on the gesture and the visual representation of the receiving user; and transmit a haptic signal associated with the haptic effect to a haptic output device configured to output the haptic effect.

These illustrative embodiments are mentioned not to limit or define the limits of the present subject matter, but to provide examples to aid understanding thereof. Illustrative embodiments are discussed in the Detailed Description, and further description is provided there. Advantages offered by various embodiments may be further understood by examining this specification and/or by practicing one or more embodiments of the claimed subject matter.

BRIEF DESCRIPTION OF THE DRAWINGS

A full and enabling disclosure is set forth more particularly in the remainder of the specification. The specification makes reference to the following appended figures.

DETAILED DESCRIPTION

Reference will now be made in detail to various and alternative illustrative embodiments and to the accompanying drawings. Each example is provided by way of explanation, and not as a limitation. It will be apparent to those skilled in the art that modifications and variations can be made. For instance, features illustrated or described as part of one embodiment may be used in another embodiment to yield a still further embodiment. Thus, it is intended that this disclosure include modifications and variations as come within the scope of the appended claims and their equivalents.

Illustrative Example of a System for Virtual Affective Touch

One illustrative embodiment of the present disclosure comprises an electronic device, such as a tablet, e-reader, mobile phone, or computer such as a laptop or desktop computer, or wearable device. The electronic device comprises a display (such as a touch-screen display), a memory, and a processor in communication with each of these elements. In the illustrative embodiment, the electronic device comprises a haptic output device configured to output haptic effects. Further, the illustrative electronic device is configured to receive user interaction with conventional interface devices, e.g., one or more of a mouse, joystick, multifunction controller, touchscreen, etc.

In the illustrative embodiment, the electronic device is configured to send data to and receive data from one or more remote electronic devices via a network connection (e.g., via Wi-Fi, cellular data, or another network known in the art). In the illustrative embodiment, the electronic device comprises a messaging application. The messaging application includes functionality to display a visual representation of other users of the messaging application. Thus, in the illustrative embodiment, a first user may engage in a messaging session with a second user. During the messaging session, each user's electronic device will display a visual representation associated with the other user. Further, in some embodiments, the messaging session may be conducted in Augmented Reality (AR) or Virtual Reality (VR).

In some embodiments, the visual representation may comprise an avatar of the receiving user. For example, the avatar may comprise an image selected by the receiving user, an image of the receiving user, or an image approximating the appearance of the receiving user. For example, in one embodiment, the avatar may comprise an animated character that approximates the appearance (e.g., the approximate height, build, hair color, etc.) of the user. Thus, during a messaging session, users will see visual representations of the other user with which they are exchanging messages.

In the illustrative embodiment, the electronic device further comprises a touch screen display. In the illustrative embodiment, a user may interact with another user's avatar (e.g., by touching the avatar on the touch screen display). When the user touches an avatar, the avatar will react to the touch. For example, the avatar may sit, stand, lay down, etc. in response to a gesture. Further, in the illustrative embodiment, the electronic device is configured to send data associated with the gesture to the remote electronic device.

In the illustrative embodiment, the electronic device further comprises one or more haptic output devices configured to receive haptic signals and output haptic effects (e.g., vibrations, textures, deformations, or other touch-based effects). For example, the illustrative messaging device may determine haptic effects associated with interactions with an avatar and output haptic signals associated with those haptic effects to a haptic output device. Thus, when one user interacts with another user's avatar, that user may receive a haptic effect associated with the interaction. These haptic effects may enhance the realism of interactions via the messaging application.

Further, in some embodiments, the haptic effects may be determined based in part on data detected about the gesture. For example, in some embodiments, the touch screen display may be configured to determine a pressure of the user interaction with avatar, e.g., determine that the pressure is heavy, medium, or light. In such an embodiment, the electronic device may be configured to determine the haptic effect based on this information. For example, the haptic effect may comprise a strong haptic effect for heavy pressure, a medium strength effect for medium pressure, and a weak haptic effect for light pressure. In other embodiments, the haptic effect may be determined based on other characteristics of the user interaction, e.g., the speed, area, direction, or some other characteristic of the user interaction.

This illustrative example is given to introduce the reader to the general subject matter discussed herein and the disclosure is not limited to this example. The following sections describe various additional non-limiting examples of the present disclosure.

Illustrative Systems for Virtual Affective Touch

Figure 1A:
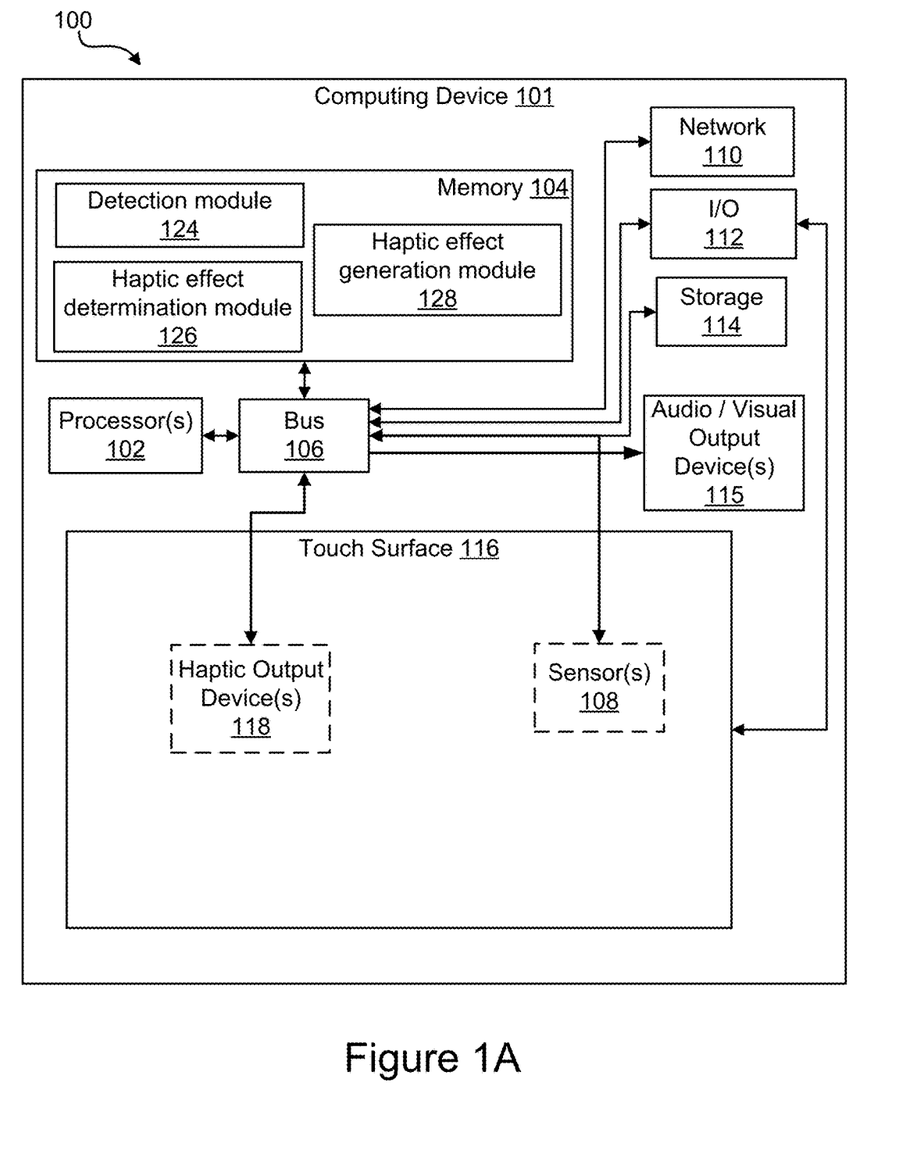
FIG. 1A shows an illustrative system for virtual affective touch according to one embodiment of the present disclosure.

FIG. 1A shows an illustrative system 100 for virtual affective touch. Particularly, in this example, system 100 comprises a computing device 101 having a processor 102 interfaced with other hardware via bus 106. A memory 104, which can comprise any suitable tangible (and non-transitory) computer-readable medium such as RAM, ROM, EEPROM, or the like, embodies program components that configure operation of the computing device 101. In this example, computing device 101 further includes one or more network interface devices 110, input/output (I/O) interface components 112, and additional storage 114.

Network device 110 can represent one or more of any components that facilitate a network connection. Examples include, but are not limited to, wired interfaces such as Ethernet, USB, IEEE 1394, and/or wireless interfaces such as IEEE 802.11, Bluetooth, or radio interfaces for accessing cellular telephone networks (e.g., transceiver/antenna for accessing a CDMA, GSM, UMTS, or other mobile communications network).

I/O components 112 may be used to facilitate connection to devices such as one or more displays, headsets comprising displays, curved displays (e.g., the display includes angled surfaces extended onto one or more sides of computing device 101 on which images may be displayed), keyboards, mice, speakers, microphones, cameras (e.g., a front and/or a rear facing camera on a mobile device) and/or other hardware used to input data or output data. Storage 114 represents nonvolatile storage such as magnetic, optical, or other storage media included in device 101.

Audio/visual output device(s) 115 comprise one or more devices configured to receive signals from processor(s) 102 and provide audio or visual output to the user. For example, in some embodiments, audio/visual output device(s) 115 may comprise a display such as a touch-screen display, LCD display, plasma display, CRT display, projection display, a headset comprising a display for each eye (e.g., for use in mixed reality or virtual reality), or some other display known in the art. Further, audio/visual output devices may comprise one or more speakers configured to output audio to a user.

System 100 further includes a touch surface 116, which, in this example, is integrated into device 101. Touch surface 116 represents any surface that is configured to sense touch input of a user. In some embodiments, touch surface 116 may be configured to detect additional information associated with the touch input, e.g., the pressure, speed of movement, acceleration of movement, temperature of the user's skin, or some other information associated with the touch input. One or more sensors 108 may be configured to detect a touch in a touch area when an object contacts a touch surface and provide appropriate data for use by processor 102. Any suitable number, type, or arrangement of sensors can be used. For example, resistive and/or capacitive sensors may be embedded in touch surface 116 and used to determine the location of a touch and other information, such as pressure. As another example, optical sensors with a view of the touch surface may be used to determine the touch position.

Further, in some embodiments, touch surface 116 and/or sensor(s) 108 may comprise a sensor that detects user interaction without relying on a touch sensor. For example, in one embodiment, the sensor may comprise a sensor configured to use electromyography (EMG) signals to detect pressure applied by a user on a surface. Further, in some embodiments, the sensor may comprise RGB or thermal cameras and use images captured by these cameras to estimate an amount of pressure the user is exerting on a surface.

In some embodiments, sensor 108 and touch surface 116 may comprise a touch-screen display or a touch-pad. For example, in some embodiments, touch surface 116 and sensor 108 may comprise a touch-screen mounted overtop of a display configured to receive a display signal and output an image to the user. In other embodiments, the sensor 108 may comprise an LED detector. For example, in one embodiment, touch surface 116 may comprise an LED finger detector mounted on the side of a display. In some embodiments, the processor is in communication with a single sensor 108, in other embodiments, the processor is in communication with a plurality of sensors 108, for example, a first touch screen and a second touch screen.

In some embodiments one or more sensor(s) 108 further comprise one or more sensors configured to detect movement of the mobile device (e.g., accelerometers, gyroscopes, cameras, GPS, or other sensors). These sensors may be configured to detect user interaction that moves the device in the X, Y, or Z plane. The sensor 108 is configured to detect user interaction, and based on the user interaction, transmit signals to processor 102. In some embodiments, sensor 108 may be configured to detect multiple aspects of the user interaction. For example, sensor 108 may detect the speed and pressure of a user interaction, and incorporate this information into the interface signal. Further, in some embodiments, the user interaction comprises a multi-dimensional user interaction away from the device. For example, in some embodiments a camera associated with the device may be configured to detect user movements, e.g., hand, finger, body, head, eye, or feet motions or interactions with another person or object.

In some embodiments, the input may comprise a gesture. A gesture is any movement of the body that conveys meaning or user intent. One or more sensors 108 are configured to detect user interaction and transmit a sensor signal associated with this interaction to processor 102, which is configured to determine whether the user interaction comprises one or more gestures and determine information about the one or more gestures. Further, in some embodiments, the processor 102 may determine factors such as the type of gesture or the pressure, speed, area, direction, or some other characteristic of the one or more gestures.

It will be recognized that simple gestures may be combined to form more complex gestures. For example, bringing a finger into contact with a touch sensitive surface may be referred to as a "finger on" gesture, while removing a finger from a touch sensitive surface may be referred to as a separate "finger off" gesture. If the time between the "finger on" and "finger off" gestures is relatively short, the combined gesture may be referred to as "tapping;" if the time between the "finger on" and "finger off" gestures is relatively long, the combined gesture may be referred to as "long tapping;" if the distance between the two dimensional (x, y) positions of the "finger on" and "finger off" gestures is relatively large, the combined gesture may be referred to as "swiping;" if the distance between the two dimensional (x, y) positions of the "finger on" and "finger off" gestures is relatively small, the combined gesture may be referred to as "smearing," "smudging," or "flicking." Any number of two dimensional or three dimensional simple or complex gestures may be combined in any manner to form any number of other gestures, including, but not limited to, multiple finger contacts, palm or first contact, or proximity to the device. A gesture can also be any form of hand movement recognized by a device having an accelerometer, gyroscope, or other motion sensor, and converted to electronic signals. Such electronic signals can activate a dynamic effect, such as shaking virtual dice, where the sensor captures the user intent that generates a dynamic effect.

In this example, a haptic output device 118 in communication with processor 102 is coupled to touch surface 116. In some embodiments, haptic output device 118 is configured, in response to a haptic signal, to output a haptic effect simulating a compliance of the touch surface. Additionally or alternatively, haptic output device 118 may provide vibrotactile haptic effects that move the touch surface in a controlled manner. Some haptic effects may utilize an actuator coupled to a housing of the device, and some haptic effects may use multiple actuators in sequence and/or in concert. For example, in some embodiments, a surface texture may be simulated by vibrating the surface at different frequencies. In such an embodiment haptic output device 118 may comprise one or more of, for example, a piezoelectric actuator, an electric motor, an electro-magnetic actuator, a voice coil, a shape memory alloy, an electro-active polymer, a solenoid, an eccentric rotating mass motor (ERM), or a linear resonant actuator (LRA). In some embodiments, haptic output device 118 may comprise a plurality of actuators, for example an ERM and an LRA. In still other embodiments, the haptic output device 118 may use non-actuated haptics (e.g., air, fluid, or ultrasonic output) that provide resistance as a means to convey rougher surfaces.

In some embodiments, the haptic effect may be modulated based on other sensed information about user interaction, e.g., relative position of hands in a virtual environment, object position in a VR/AR environment, object deformation, relative object interaction in a GUI, UI, AR, VR, etc. In still other embodiments, methods to create the haptic effects include the variation of an effect of short duration where the magnitude of the effect varies as a function of a sensed signal value (e.g., a signal value associated with user interaction). In some embodiments, when the frequency of the effect can be varied, a fixed perceived magnitude can be selected and the frequency of the effect can be varied as a function of the sensed signal value.

For example, in one embodiment a user may make a gesture in real space, e.g., a hand movement. During the movement, the user's hand may be tracked as it moves from a first location to a second location. A haptic effect may be determined based on this gesture. Further, the haptic effect may be varied as a function of the user's position (e.g., a function of the distance between the two points or the user's position between the two points). For example, in one embodiment the processor 101 may modify one or more of the frequency, amplitude, grain size, grain magnitude, or grain density of the haptic effect based in part on the gesture (e.g., based on the distance between two points and/or the distance between the user's hand and one of the points). Further, in some embodiments, the gesture may comprise a gesture in mixed reality. Thus, in some embodiments, the gesture may comprise a gesture in virtual reality, and may comprise a movement between two points in virtual reality.

Although a single haptic output device 118 is shown here, embodiments may use multiple haptic output devices of the same or different type to output haptic effects. For example, in one embodiment, a piezoelectric actuator may be used to displace some or all of touch surface 116 vertically and/or horizontally at ultrasonic frequencies, such as by using an actuator moving at frequencies greater than 20-25 kHz in some embodiments. In some embodiments, multiple actuators such as eccentric rotating mass motors and linear resonant actuators can be used alone or in concert to provide different textures and other haptic effects.

In still other embodiments, haptic output device 118 may use electrostatic force, for example by use of an electrostatic surface actuator, to simulate a texture on the surface of touch surface 116. Similarly, in some embodiments haptic output device 118 may use electrostatic force to vary the friction the user feels on the surface of touch surface 116. For example, in one embodiment, haptic output device 118 may comprise an electrostatic display or any other device that applies voltages and currents instead of mechanical motion to generate a haptic effect. In such an embodiment, an electrostatic actuator may comprise a conducting layer and an insulating layer. In such an embodiment, the conducting layer may be any semiconductor or other conductive material, such as copper, aluminum, gold, or silver. And the insulating layer may be glass, plastic, polymer, or any other insulating material.

The processor 102 may operate the electrostatic actuator by applying an electric signal to the conducting layer. The electric signal may be an AC signal that, in some embodiments, capacitively couples the conducting layer with an object near or touching touch surface 116. In some embodiments, the AC signal may be generated by a high-voltage amplifier. In other embodiments the capacitive coupling may simulate a friction coefficient or texture on the surface of the touch surface 116. For example, in one embodiment, the surface of touch surface 116 may be smooth, but the capacitive coupling may produce an attractive force between an object near the surface of touch surface 116. In some embodiments, varying the levels of attraction between the object and the conducting layer can vary the simulated texture on an object moving across the surface of touch surface 116 or vary the coefficient of friction felt as the object moves across the surface of touch surface 116. Furthermore, in some embodiments, an electrostatic actuator may be used in conjunction with traditional actuators to vary the simulated texture on the surface of touch surface 116. For example, the actuators may vibrate to simulate a change in the texture of the surface of touch surface 116, while at the same time; an electrostatic actuator may simulate a different texture, or other effects, on the surface of touch surface 116 or on another part of the computing device 101 (e.g., its housing or another input device).

In some embodiments, an electrostatic actuator may be used to generate a haptic effect by stimulating parts of the body near or in contact with the touch surface 116. For example, in some embodiments, an electrostatic actuator may stimulate the nerve endings in the skin of a user's finger or components in a stylus that can respond to the electrostatic actuator. The nerve endings in the skin, for example, may be stimulated and sense the electrostatic actuator (e.g., the capacitive coupling) as a vibration or some more specific sensation. For example, in one embodiment, a conducting layer of an electrostatic actuator may receive an AC voltage signal that couples with conductive parts of a user's finger. As the user touches the touch surface 116 and moves his or her finger on the touch surface, the user may sense a texture of prickliness, graininess, bumpiness, roughness, stickiness, or some other texture.

Turning to memory 104, exemplary program components 124, 126, and 128 are depicted to illustrate how a device can be configured in some embodiments to provide virtual affective touch. In this example, a detection module 124 configures processor 102 to monitor touch surface 116 via sensor 108 to determine a touch, e.g., the position and/or pressure of a touch. For example, module 124 may sample sensor 108 in order to track the presence or absence of a touch and, if a touch is present, to track one or more of the location, path, velocity, acceleration, pressure, and/or other characteristics of the touch over time.

Haptic effect determination module 126 represents a program component that analyzes data regarding touch characteristics to select a haptic effect to generate. For example, in one embodiment, module 126 comprises code that determines, based on the touch, a haptic effect to generate. For example, module 126 may comprise program code configured to determine a grain size, grain density, max grain per cycle, and/or grain magnitude for a haptic signal, based in part on the touch (e.g., the pressure of the touch). Alternatively, in some embodiments, haptic effect determination module 126 may comprise one or more preloaded haptic effects, e.g., haptic effects associated with particular objects in a mixed reality or virtual reality environment. These haptic effects may comprise any type of haptic effect that haptic output device(s) 118 are capable of generating. Further, in some embodiments, module 126 may comprise program code configured to manipulate characteristics of a haptic effect, e.g., the effect's intensity, frequency, duration, duty cycle, or any other characteristic associated with a haptic effect. In some embodiments, module 126 may comprise program code to allow the user to manipulate these characteristics, e.g., via a graphical user interface.

Further, in some embodiments, module 126 may comprise program code configured to determine haptic effects based on user interactions. For example, module 126 may be configured to monitor user input on touch surface 116 or other sensors, such as inertial sensors, configured to detect motion of the mobile device. Module 126 may detect this input and generate a haptic effect based on the input. For example, in some embodiments module 126 may be configured to determine a haptic effect configured to simulate the user interaction.

Haptic effect generation module 128 represents programming that causes processor 102 to generate and transmit a haptic signal to haptic output device 118, which causes haptic output device 118 to generate the selected haptic effect. For example, generation module 128 may access stored waveforms or commands to send to haptic output device 118. As another example, haptic effect generation module 128 may receive a desired type of effect and utilize signal processing algorithms to generate an appropriate signal to send to haptic output device 118. As a further example, a desired effect may be indicated along with target coordinates for the haptic effect and an appropriate waveform sent to one or more actuators to generate appropriate displacement of the surface (and/or other device components) to provide the haptic effect. Some embodiments may utilize multiple haptic output devices in concert to output a haptic effect.

Figure 1B:
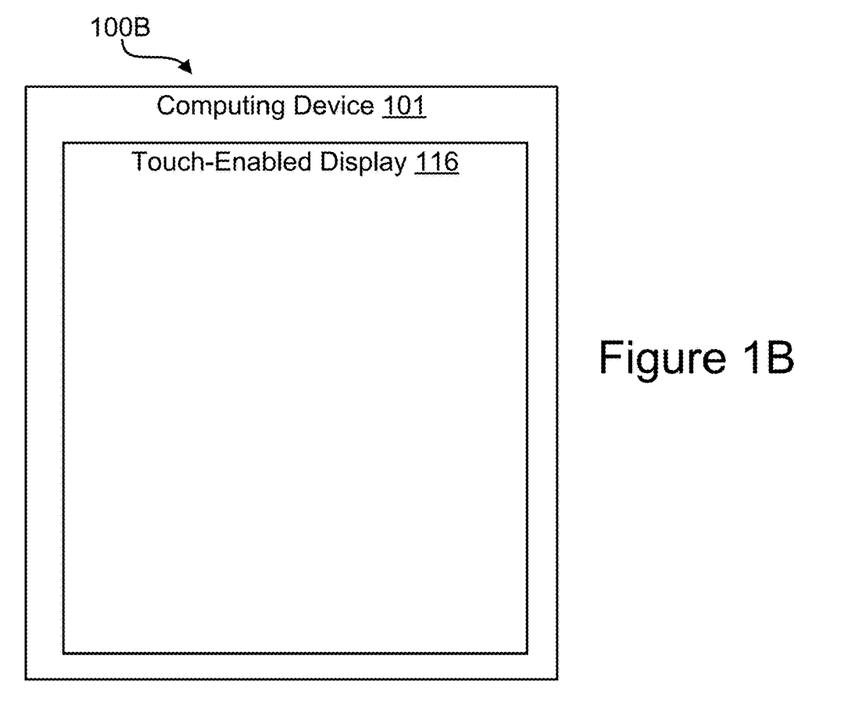
FIG. 1B shows an external view of one embodiment of the system shown in FIG. 1A.

A touch surface may overlay (or otherwise correspond to) a display, depending on the particular configuration of a computing system. In FIG. 1B, an external view of a computing system 100B is shown. Computing device 101 includes a touch enabled display 116 that combines a touch surface and a display of the device. The touch surface may correspond to the display exterior or one or more layers of material above the actual display components.

Figure 1C:
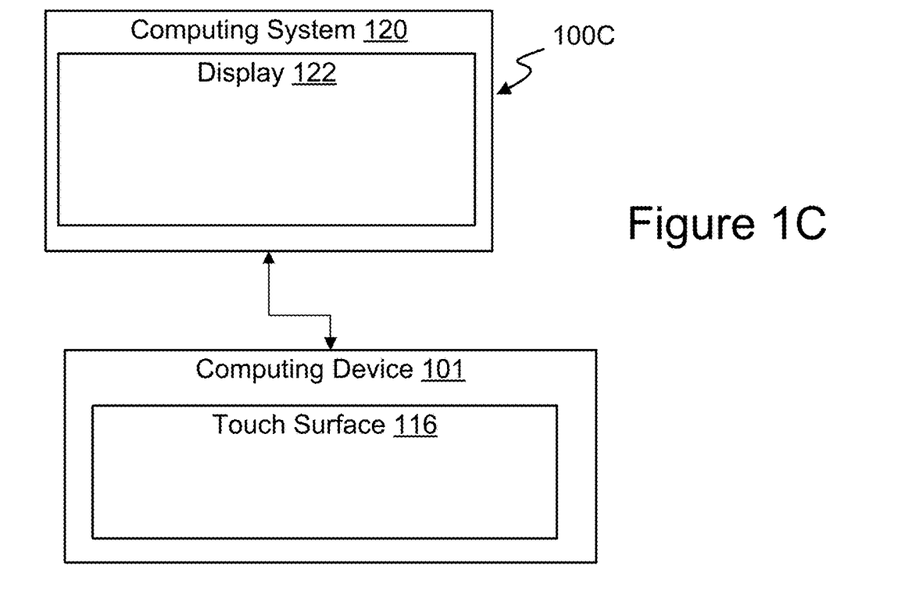
FIG. 1C illustrates an external view of another embodiment of the system shown in FIG. 1A.

FIG. 1C illustrates another example of a touch enabled computing system 100C in which the touch surface does not overlay a display. In this example, a computing device 101 features a touch surface 116 which may be mapped to a graphical user interface provided in a display 122 that is included in computing system 120 interfaced to device 101. For example, computing device 101 may comprise a mouse, trackpad, or other device, while computing system 120 may comprise a desktop or laptop computer, set-top box (e.g., DVD player, DVR, cable television box), or another computing system. As another example, touch surface 116 and display 122 may be disposed in the same device, such as a touch enabled trackpad in a laptop computer featuring display 122. Whether integrated with a display or otherwise, the depiction of planar touch surfaces in the examples herein is not meant to be limiting. Other embodiments include curved or irregular touch enabled surfaces that are further configured to provide haptic effects.

Figure 2A:
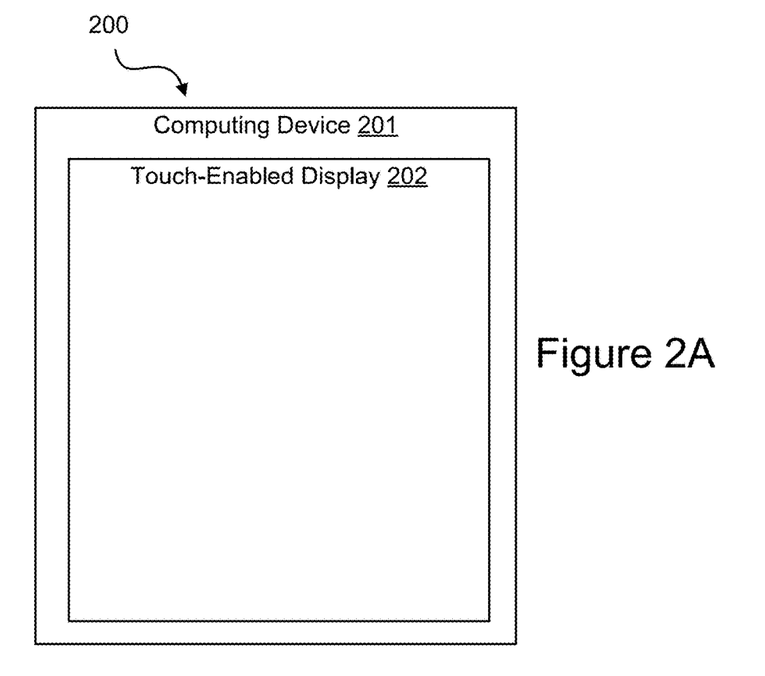
FIG. 2A illustrates an example embodiment for virtual affective touch according to one embodiment of the present disclosure.
Figure 2B:
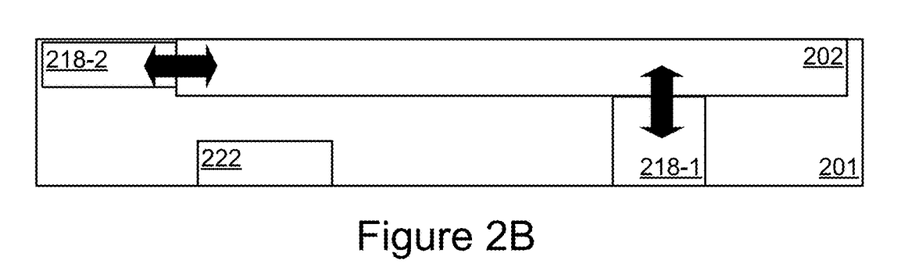
FIG. 2B illustrates another example embodiment virtual affective touch according to one embodiment of the present disclosure.

FIGS. 2A-2B illustrate an example embodiment of a device for virtual affective touch. FIG. 2A is a diagram illustrating an external view of a system 200 comprising a computing device 201 that features a touch-enabled display 202. FIG. 2B shows a cross-sectional view of device 201. Device 201 may be configured similarly to device 101 of FIG. 1A, though components such as the processor, memory, sensors, and the like are not shown in this view for purposes of clarity.

As can be seen in FIG. 2B, device 201 features a plurality of haptic output devices 218 and an additional haptic output device 222. Haptic output device 218-1 may comprise an actuator configured to impart vertical force to display 202, while 218-2 may move display 202 laterally. In this example, the haptic output devices 218, 222 are coupled directly to the display, but it should be understood that the haptic output devices 218, 222 could be coupled to another touch surface, such as a layer of material on top of display 202. Furthermore, it should be understood that one or more of haptic output devices 218 or 222 may comprise an electrostatic actuator, as discussed above. Furthermore, haptic output device 222 may be coupled to a housing containing the components of device 201. In the examples of FIGS. 2A-2B, the area of display 202 corresponds to the touch area, though the principles could be applied to a touch surface completely separate from the display.

In one embodiment, haptic output devices 218 each comprise a piezoelectric actuator, while additional haptic output device 222 comprises an eccentric rotating mass motor, a linear resonant actuator, or another piezoelectric actuator. Haptic output device 222 can be configured to provide a vibrotactile haptic effect in response to a haptic signal from the processor. The vibrotactile haptic effect can be utilized in conjunction with surface-based haptic effects and/or for other purposes.

In some embodiments, either or both haptic output devices 218-1 and 218-2 can comprise an actuator other than a piezoelectric actuator. Any of the actuators can comprise a piezoelectric actuator, an electromagnetic actuator, an electroactive polymer, a shape memory alloy, a flexible composite piezo actuator (e.g., an actuator comprising a flexible material), electrostatic, and/or magnetostrictive actuators, for example. Additionally, haptic output device 222 is shown, although multiple other haptic output devices can be coupled to the housing of device 201 and/or haptic output devices 222 may be coupled elsewhere. Device 201 may feature multiple haptic output devices 218-1/218-2 coupled to the touch surface at different locations, as well.

Figure 3A:
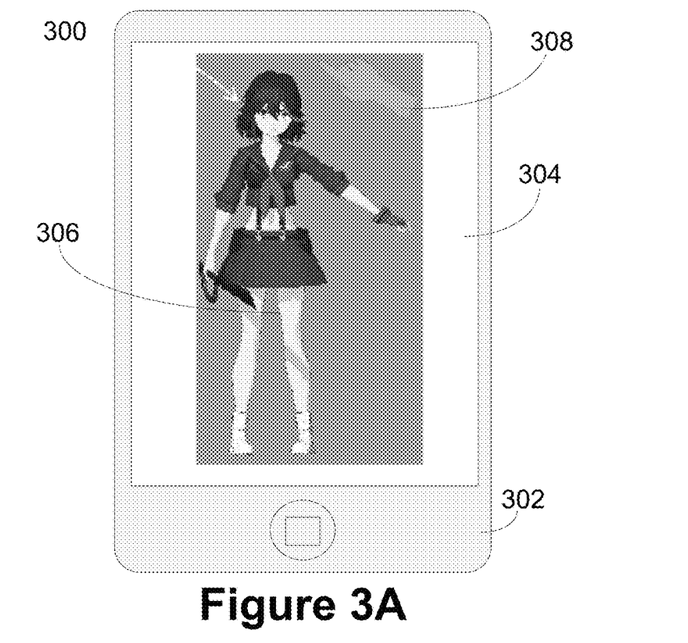
FIG. 3A illustrates another example embodiment for virtual affective touch according to one embodiment of the present disclosure.

Turning now to FIG. 3A, FIG. 3A illustrates another example embodiment for virtual affective touch according to one embodiment of the present disclosure. FIG. 3A shows system 300. System 300 comprises a mobile device 302, display 304, and a visual representation 306 shown in the display 304. As shown in FIG. 3A, the system 300 is further configured to detect user interaction. The user interaction is shown as a finger 308 making a gesture on the display 304. Mobile device 302 comprises any type of mobile device known in the art, e.g., a smartphone, tablet, laptop, or other type of device. Display 304 may further comprise a touch-sensitive input device, e.g., a touch-screen.

As shown in FIG. 3A, the display 304 comprises a visual representation 306. The visual representation 306 represents a user remote from mobile device 302 (a "remote user"), engaging in a messaging session with the user of mobile device 302. In some embodiments, the visual representation 306 may comprise an avatar associated with the remote user. In some embodiments, the avatar may comprise an animated character that approximates the appearance of the remote user, e.g., the avatar may comprise the approximate height, build, hair style, hair color, etc. of the remote user. In other embodiments, the avatar may comprise an image of the remote user and/or an image selected by the remote user.

In the embodiment shown in FIG. 3A, the user of the mobile device 302 may interact with the visual representation 306. As the user of mobile device 302 interacts with the visual representation 306, the visual representation 306 may respond to the interaction. For example, a gesture by the user of mobile device 302 may be detected by one or more sensors. A processor of the mobile device 302 receives signals from these one or more sensors and determines an action by the visual representation 306. For example, a gesture may cause the avatar to sit, stand, lie down, wave, turn, jump, do a flip, or take some other action.

In some embodiments, one or more sensors or display 304 may be configured to determine factors associated with the user interaction, e.g., the pressure, speed, area, direction, or some other characteristic of the user interaction. In such an embodiment, the mobile device 302 may determine different actions of the visual representation 306 based on the factors associated with the user interaction. For example, a high pressure user interaction may case the visual representation 306 to sit or fall backwards. Similarly, a fast user interaction may cause the visual representation 306 to turn its head quickly.

Further, the processor may transmit a signal associated with the gesture to the remote device. The remote device may determine a haptic effect based on the gesture. Thus, when a user of mobile device 302 interacts with a visual representation 306 of a remote user, the remote user's mobile device may output a corresponding haptic effect. This haptic effect may enhance the realism of the interaction between the user of mobile device 302 and the remote user.

In some embodiments, the mobile device 302 may also determine a haptic effect and output a haptic signal to one or more haptic output devices configured to output the haptic effect. Thus, the user of the mobile device 302 may feel a haptic effect at the same time as the user of a remote device. In some embodiments, a processor of the mobile device 302 may determine the haptic effect and transmit a signal associated with the haptic effect to the remote device. Further, in some embodiments, the remote user may interact with a visual representation 306 of the user of mobile device 302 displayed on the remote device. The remote device may transmit signals associated with the interaction to mobile device 302, which then outputs a haptic effect associated with the interaction.

As discussed above, in some embodiments, one or more sensors or display 304 may be configured to determine factors associated with the user interaction, e.g., the pressure, speed, area, direction, or some other characteristic of the user interaction. In such an embodiment, the mobile device 302 may determine haptic effects based on the factors. For example, the haptic effect may comprise a strong haptic effect for heavy pressure, a medium strength effect for medium pressure, and a weak haptic effect for light pressure. In other embodiments, the haptic effect may be determined based on other characteristics of the user interaction, e.g., the speed, area, direction, or some other characteristic of the user interaction.

Figure 3B:
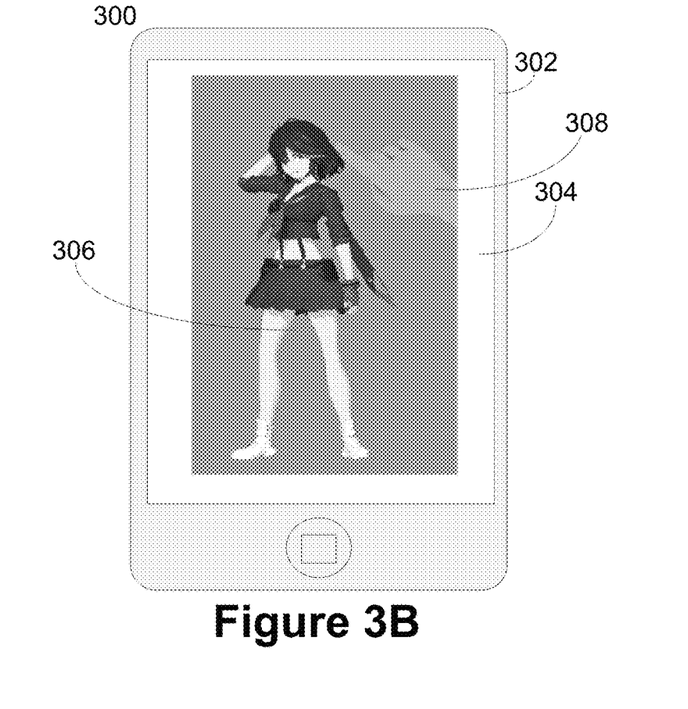
FIG. 3B illustrates another example embodiment for virtual affective touch according to one embodiment of the present disclosure.

Turning now to FIG. 3B, FIG. 3B illustrates another example embodiment for virtual affective touch according to one embodiment of the present disclosure. FIG. 3B shows another view of system 300. As shown in FIG. 3B, a finger 308 has made a gesture associated with the head of visual representation 306. In some embodiments the visual representation 306 may respond to the gesture. For example, in the embodiment shown in FIG. 3B, the visual representation 306 has turned its head. In other embodiments, the gesture may cause the visual representation 306 sit, stand, lie down, wave, turn, jump, do a flip, or take some other action.

Figure 3C:
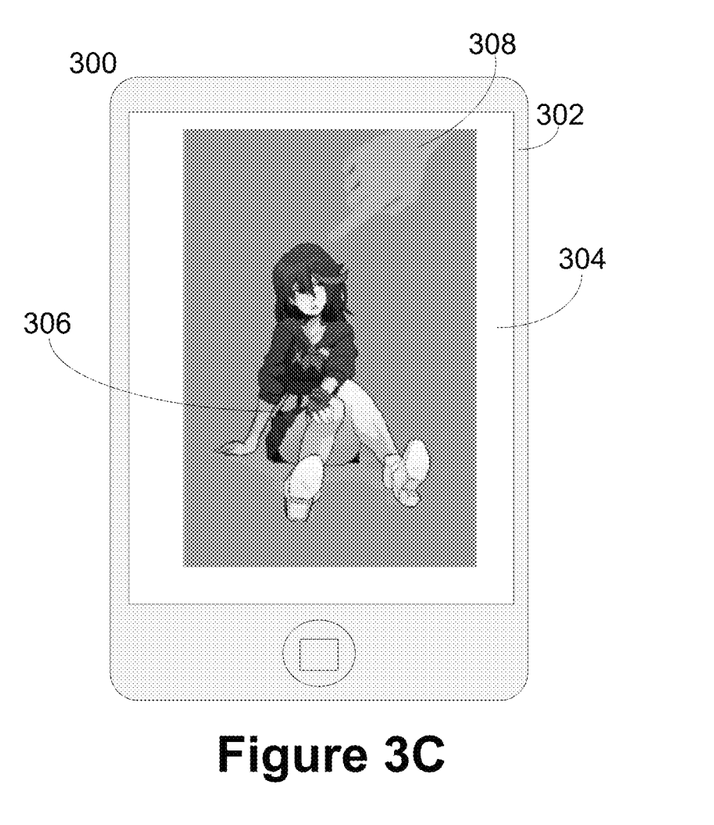
FIG. 3C illustrates another example embodiment for virtual affective touch according to one embodiment of the present disclosure.

Turning now to FIG. 3C, FIG. 3C illustrates another example embodiment for virtual affective touch according to one embodiment of the present disclosure. FIG. 3C shows another view of system 300. In FIG. 3C, the visual representation 306 has sat in response to a gesture by finger 308. In some embodiments, additional gestures by finger 308 may lead to additional movement by the visual representation 306.

Figure 4:
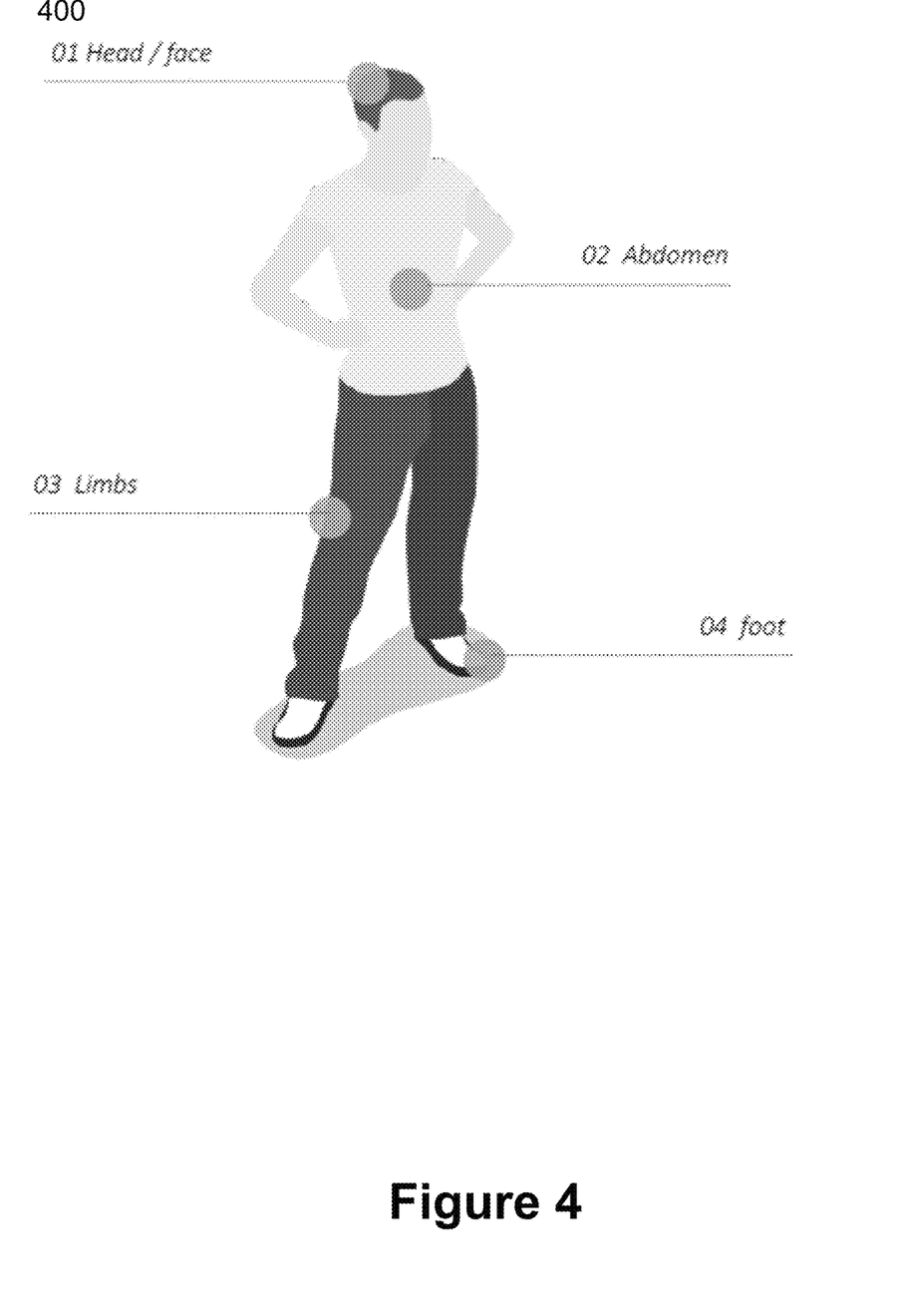
FIG. 4 illustrates another example embodiment for virtual affective touch according to one embodiment of the present disclosure.

Turning now to FIG. 4, FIG. 4 illustrates another example embodiment for virtual affective touch according to one embodiment of the present disclosure. FIG. 4 shows a visual representation 400. As shown in FIG. 4, the visual representation 400 comprises a plurality of areas, 01 head/face, 02 abdomen, 03 limbs, and 04 foot. In some embodiments, a gesture associated with each of these areas will trigger a different movement by the visual representation 400, and will trigger a mobile device associated with the visual representation 400 to output a different haptic effect.

In one example embodiment, a user may interact with 04 foot. Based on such an interaction, the visual representation 400 may jump. Further, a corresponding haptic effect may be determined, e.g., a knocking effect associated with the visual representation 400 jumping and landing. Further, in another example embodiment, a user may interact with 01 head/face. Based on such an interaction the avatar 400 may turn its head from side to side. Further a haptic effect associated with this interaction may be determined, e.g., a soft vibration to simulate movement of the hair of visual representation 400.

Illustrative Methods for Virtual Affective Touch

Figure 5:
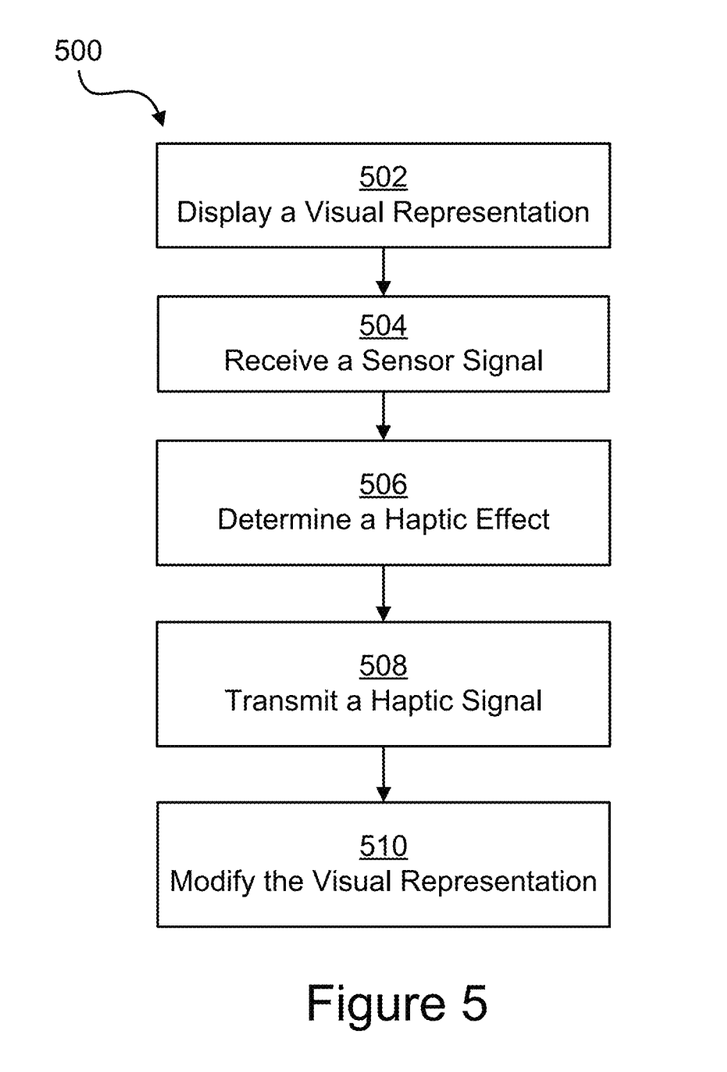
FIG. 5 is a flow chart of method steps for virtual affective touch according to one embodiment of the present disclosure.

FIG. 5 is a flow chart of steps for performing a method for virtual affective touch according to one embodiment. In some embodiments, the steps in FIG. 5 may be implemented in program code that is executed by a processor, for example, the processor in a general purpose computer, a mobile device, virtual reality control system, or a server. In some embodiments, these steps may be implemented by a group of processors. In some embodiments one or more steps shown in FIG. 5 may be omitted or performed in a different order. Similarly, in some embodiments, additional steps not shown in FIG. 5 may also be performed. The steps below are described with reference to components described above with regard to computing device 101 shown in FIG. 1A.

The method 500 begins at step 502 when the processor 102 displays a visual representation. The visual representation comprises an image associated with a user of a remote device. In some embodiments, the visual representation may comprise an avatar of the remote user, as discussed above.

Next, at step 504, the processor 102 receives a sensor signal from one or more sensors 108. As explained above, one or more sensors 108 are configured to detect user interaction and transmit a sensor signal associated with this interaction to processor 102, which is configured to determine whether the user interaction comprises one or more gestures and determine information about the one or more gestures. In some embodiments the gesture comprises a gesture associated with the visual representation. For example, the gesture may comprise an interaction with one or more areas of the avatar (e.g., one or more of the areas discussed above with regard to FIG. 4). Further, in some embodiments, the processor 102 may determine factors such as the type of gesture or the pressure, speed, area, direction, or some other characteristic of the gesture.

Then, at step 506, the processor 102 determines a haptic effect. In some embodiments the haptic effect may be configured to simulate movement of the visual representation. Further, in some embodiments, the haptic effect may be configured to enhance features associated a mixed reality or virtual reality interface. In some embodiments, the processor 102 may determine a haptic effect by determining and/or modifying a frequency, amplitude, modulation, or duty cycle of operation of one or more haptic output devices 118. In some embodiments, the processor 102 may determine the haptic effect based in part on the features determined about a gesture, e.g., the type of gesture, the pressure, speed, area, direction, or some other characteristic of the gesture.

In other embodiments, the processor 102 may determine a haptic effect based on user selection. For example, the user may select an available haptic effect. For example, a data store of computing device 101 may comprise data associated with multiple haptic effects, which a haptic designer or user may select. Further, the haptic designer or user may adjust characteristics associated with the haptic effect. For example, the haptic designer may modify the duration, frequency, intensity, or some other characteristic associated with the haptic effect. In some embodiments, the processor 102 may automatically select the haptic effect. For example, in some embodiments, the processor 102 may select a haptic effect associated with events occurring within a video displayed on the face of a display of computing device 101. Further, in some embodiments, processor 102 may execute predesigned algorithms to modify parameters of the haptic effects.

At step 508 the processor 102 transmits a haptic signal. In some embodiments, the processor transmits the haptic signal to one or more haptic output devices 118, which output the haptic effect. Alternatively or additionally, in some embodiments, the processor transmits the haptic signal to a remote device. In such an embodiment, the remote device may output the haptic effect, thus enabling a user of the remote device to receive a haptic effect associated with the gesture associated with the visual representation. Further, in some embodiments, the processor 102 may transmit a signal associated with the gesture to the remote device and the remote device may determine the haptic effect.

At step 510 the processor 102 modifies the visual representation. For example, the processor 102 may cause the visual representation to sit, stand, lie down, wave, turn, jump, do a flip, or some other movement in response to the user interaction. The processor 102 outputs a display signal to audio visual output device(s) 115, which may comprise a display. In some embodiments, the display signal may comprise the characters and/or objects in the mixed reality or virtual reality interface. The object or character may react to the user interaction at the same time the haptic effect is output, thus further increasing the reality of the mixed reality or virtual reality experience.

There are numerous advantages of virtual affective touch. Embodiments discussed herein lead to more realistic mixed reality or virtual reality experiences. Thus, users may have greater pleasure and experience when interacting with devices and software equipped with the features described herein. Thus, each of the examples above increase user satisfaction and thus lead to greater user adoption of the technology described herein.

General Considerations

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process that is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the present disclosure. Also, a number of steps may be undertaken before, during, or after the above elements are considered. Accordingly, the above description does not bound the scope of the claims.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

Embodiments in accordance with aspects of the present subject matter can be implemented in digital electronic circuitry, in computer hardware, firmware, software, or in combinations of the preceding. In one embodiment, a computer may comprise a processor or processors. The processor comprises or has access to a computer-readable medium, such as a random access memory (RAM) coupled to the processor. The processor executes computer-executable program instructions stored in memory, such as executing one or more computer programs including a sensor sampling routine, selection routines, and other routines to perform the methods described above.

Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example tangible computer-readable media, that may store instructions that, when executed by the processor, can cause the processor to perform the steps described herein as carried out, or assisted, by a processor. Embodiments of computer-readable media may comprise, but are not limited to, all electronic, optical, magnetic, or other storage devices capable of providing a processor, such as the processor in a web server, with computer-readable instructions. Other examples of media comprise, but are not limited to, a floppy disk, CD-ROM, magnetic disk, memory chip, ROM, RAM, ASIC, configured processor, all optical media, all magnetic tape or other magnetic media, or any other medium from which a computer processor can read. Also, various other devices may include computer-readable media, such as a router, private or public network, or other transmission device. The processor, and the processing, described may be in one or more structures, and may be dispersed through one or more structures. The processor may comprise code for carrying out one or more of the methods (or parts of methods) described herein.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

What is claimed:

1. A system comprising:
   a touch screen display;
   a haptic output device; and
   a processor configured to:
   display a visual representation of a receiving user on the touch screen display;
   determine a sensor signal based on a gesture by a sending user on the touch screen display;
   transmit a signal comprising data determined based on both the gesture and the visual representation of the receiving user to a receiving device;
   determine a haptic effect based in part on the gesture and the visual representation of the receiving user; and
   transmit a haptic signal associated with the haptic effect to the haptic output device configured to output the haptic effect.

2. The system of claim 1, wherein the processor is further configured to:
   transmit the haptic signal to the receiving device and wherein the receiving device comprises a second haptic output device configured to output the haptic effect.

3. The system of claim 1, wherein the processor is further configured to:
   receive a second sensor signal from the receiving device and determine the haptic effect based in part on the second sensor signal.

4. The system of claim 1, wherein the processor is further configured to: receive a second haptic signal from the receiving device and output a second haptic effect based in part on the second haptic signal.

5. The system of claim 1, wherein the visual representation of a receiving user comprises an avatar.

6. The system of claim 5, wherein the avatar is selected by the receiving user.

7. The system of claim 1, wherein determining a haptic effect comprises determining a pressure associated with the gesture and determining a haptic effect with a strength corresponding to the pressure of the gesture.

8. The system of claim 1, wherein the touch screen display, the haptic output device, and the processor are all components of one of: a handheld device or a wearable device.

9. The system of claim 1, wherein the haptic output device comprises one or more of: a piezoelectric actuator, an electric motor, an electro-magnetic actuator, a voice coil, a shape memory alloy, an electro-active polymer, a solenoid, an eccentric rotating mass motor, a linear resonant actuator, or an electrostatic output device.

10. A method comprising:
    displaying a visual representation of a receiving user on a touch screen display;
    determining a sensor signal based on a gesture by a sending user on the touch screen display;
    transmitting a signal comprising data determined based on both the gesture and the visual representation of the receiving user to a receiving device;
    determining a haptic effect based in part on the gesture and the visual representation of the receiving user; and
    transmitting a haptic signal associated with the haptic effect to a haptic output device configured to output the haptic effect.

11. The method of claim 10, further comprising transmitting the haptic signal to the receiving device and wherein the receiving device comprises a second haptic output device configured to output the haptic effect.

12. The method of claim 10, further comprising receiving a second sensor signal from the receiving device and outputting a second haptic effect based in part on the second sensor signal.

13. The method of claim 10, further comprising receiving a second haptic signal from the receiving device and outputting a second haptic effect based in part on the second haptic signal.

14. The method of claim 10, wherein the visual representation of a receiving user comprises an avatar.

15. The method of claim 14, wherein the avatar is selected by the receiving user.

16. The method of claim 10, wherein determining a haptic effect comprises determining a pressure associated with the gesture and determining a haptic effect with a strength corresponding to the pressure of the gesture.

17. A non-transitory computer readable medium comprising program code, which when executed by a processor is configured to cause the processor to:
    display a visual representation of a receiving user on a touch screen display;
    determine a sensor signal based on a gesture by a sending user on the touch screen display;
    transmit a signal comprising data determined based on both the gesture and the visual representation of the receiving user to a receiving device;
    determine a haptic effect based in part on the gesture and the visual representation of the receiving user; and
    transmit a haptic signal associated with the haptic effect to a haptic output device configured to output the haptic effect.

18. The non-transitory computer readable medium of claim 17, further comprising program code, which when executed by the processor is configured to cause the processor to:
    transmit the haptic signal to the receiving device and wherein the receiving device comprises a second haptic output device configured to output the haptic effect.

19. The non-transitory computer readable medium of claim 17, further comprising program code, which when executed by the processor is configured to cause the processor to:
    receive a second sensor signal from the receiving device and output a second haptic effect based in part on the second sensor signal.

20. The non-transitory computer readable medium of claim 17, further comprising program code, which when executed by the processor is configured to cause the processor to:
    receive a second haptic signal from the receiving device and output a second haptic effect based in part on the second haptic signal.

* * * * *